Figure 1:
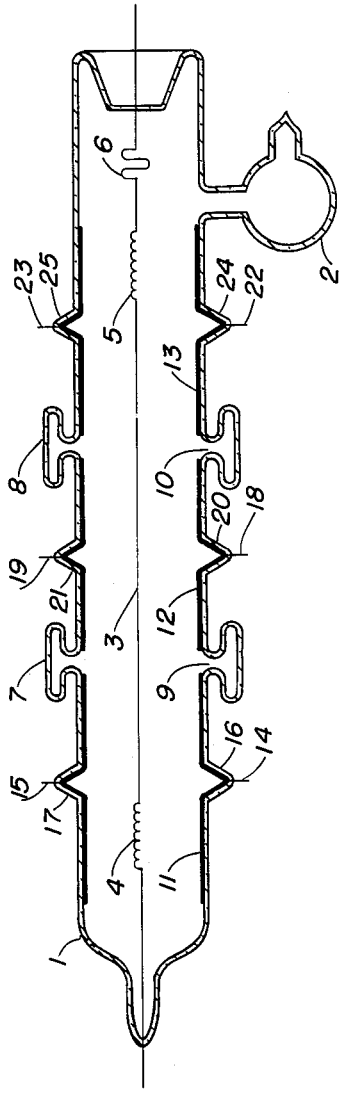

April 12, 1966 R. L. AAMODT ET AL 3,246,196
METHOD AND MEANS FOR IMPROVING THE ELECTRON EMISSION FROM
A REFRACTORY CONDUCTING MATERIAL
Filed June 8, 1962 7 Sheets-Sheet 1

INVENTOR.
Rodney L. Aamodt, Leon J. Brown, Billy D. Nichols
BY
Roland A. Anderson
Attorney INVENTOR.
Rodney L. Aamodt, Leon J. Brown, Billy D. Nichols INVENTOR.
Rodney L. Aamodt, Leon J. Brown, Billy D. Nichols INVENTOR.
Rodney L. Aamodt, Leon J. Brown, Billy D. Nichols INVENTOR.
Rodney L. Aamodt, Leon J. Brown, Billy D. Nichols United States Patent Office 3,246,196
Patented Apr. 12, 1966

3,246,196
METHOD AND MEANS FOR IMPROVING THE ELECTRON EMISSION FROM A REFRACTORY CONDUCTING MATERIAL
Rodney L. Aamodt, Santa Fe, Leon J. Brown and Billy D. Nichols, Los Alamos, N. Mex., assignors to the United States of America as represented by the United States Atomic Energy Commission
Filed June 8, 1962, Ser. No. 201,222
3 Claims. (Cl. 313—310)

The invention described herein was made in the course of, or under, a contract with the U.S. Atomic Energy Commission.

This invention relates to means of improving the electron emission from refractory materials and more particularly to improving the electron emission of molybdenum by the addition of cesium fluoride.

The present invention is particularly useful in a thermionic converter. A cathode in a thermionic converter embodying the present invention would be among the most efficient known.

In an efficient thermionic converter the energy carried away from the cathode by electrons must be of the same order as the energy lost by radiation. This is possible only if the cathode work function is sufficiently low. There exist few refractory materials with low work function. Cesium vapor is often used in thermionic converters to lower the cathode work function and to neutralize space charge. Langmuir and Taylor, see Physical Review 44, 423 (1933), showed how adsorbed cesium can lower the work function of tungsten, the evaporating cesium being replaced by incoming atoms from the surrounding vapor.

In order to produce sufficient cesium ions by the surface ionization process a work function near 3 ev. is required. A cathode with this work function must be operated at temperatures near 2000° K. for efficient thermionic conversion. To lower the work function of tungsten to 3 ev. at 2000° K., the cesium arrival rate, $\mu_a$, must be $10^{21}$ atoms per $cm.^2$ per sec. The mean free path of electrons in cesium is only a few microns at this arrival rate. It has been shown that the efficiency of a thermionic converter falls rapidly unless the cathode-anode spacing is less than a few electron scattering lengths, but such small spacing as is required here causes difficulties in construction and makes for an unreliable device. One way out of this dilemma is to lower the cathode temperature and make ions by some other means than surface ionization, i.e., separate ionizing grids, "patchy" cathode, low voltage arcs, auxiliary arcs, etc.

The present invention takes a different approach, i.e., to improve the cathode properties so that the cesium "adatoms" are more tightly bound, allowing operation at a lower cesium arrival rate and therefore at lower cesium pressures with correspondingly greater electrode spacing. Langmuir and his co-workers demonstrated the increased affinity of cesium atoms for tungsten which had a monolayer of oxygen adsorbed on the surface, see Proc. Roy. Soc. A, 107, 61 (1925), and J. Am. Chem. Soc. 53, 486 (1931). The consequent lower evaporation rate makes it possible to maintain a given fractional coverage of the tungsten surface, $\theta$, at lower cesium pressures. The oxygen "adatoms" have a half-life of ~72 seconds at 2000° K., see J. Am. Chem. Soc. 54, 2798 (1932), so new oxygen atoms must be supplied at a corresponding rate in order to operate at this temperature. The minimum work function of the tungsten-oxygen-cesium surface is lower than that of a tungsten-cesium surface, about 1.4 vs. 1.7 ev.

Fluorine is more electronegative than oxygen and even more tightly bound to tungsten, as shown by Metlay and Kimball, J. Chem. Phys. 16, 779 (1948). In addition, cesium fluoride is rather volatile and decomposes on striking a hot metallic surface, see Phys. Rev. 85, 136 (1952).

It is an object of the present invention to improve the electron emission from a refractory material.

It is a further object of the invention to greatly enhance the electron emission of tungsten, molybdenum, and other refractory conducting materials by the addition of cesium fluoride.

Figure 2:
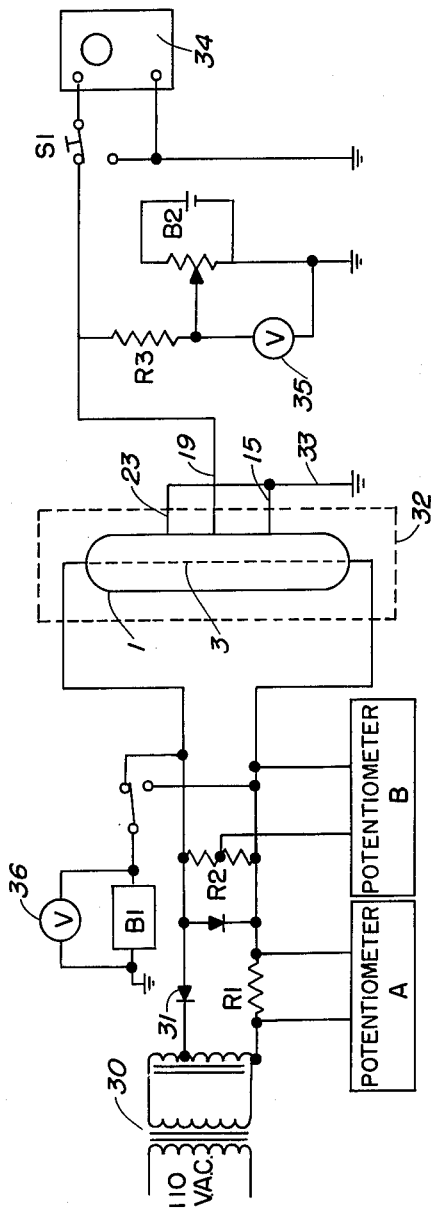
Figure 3:
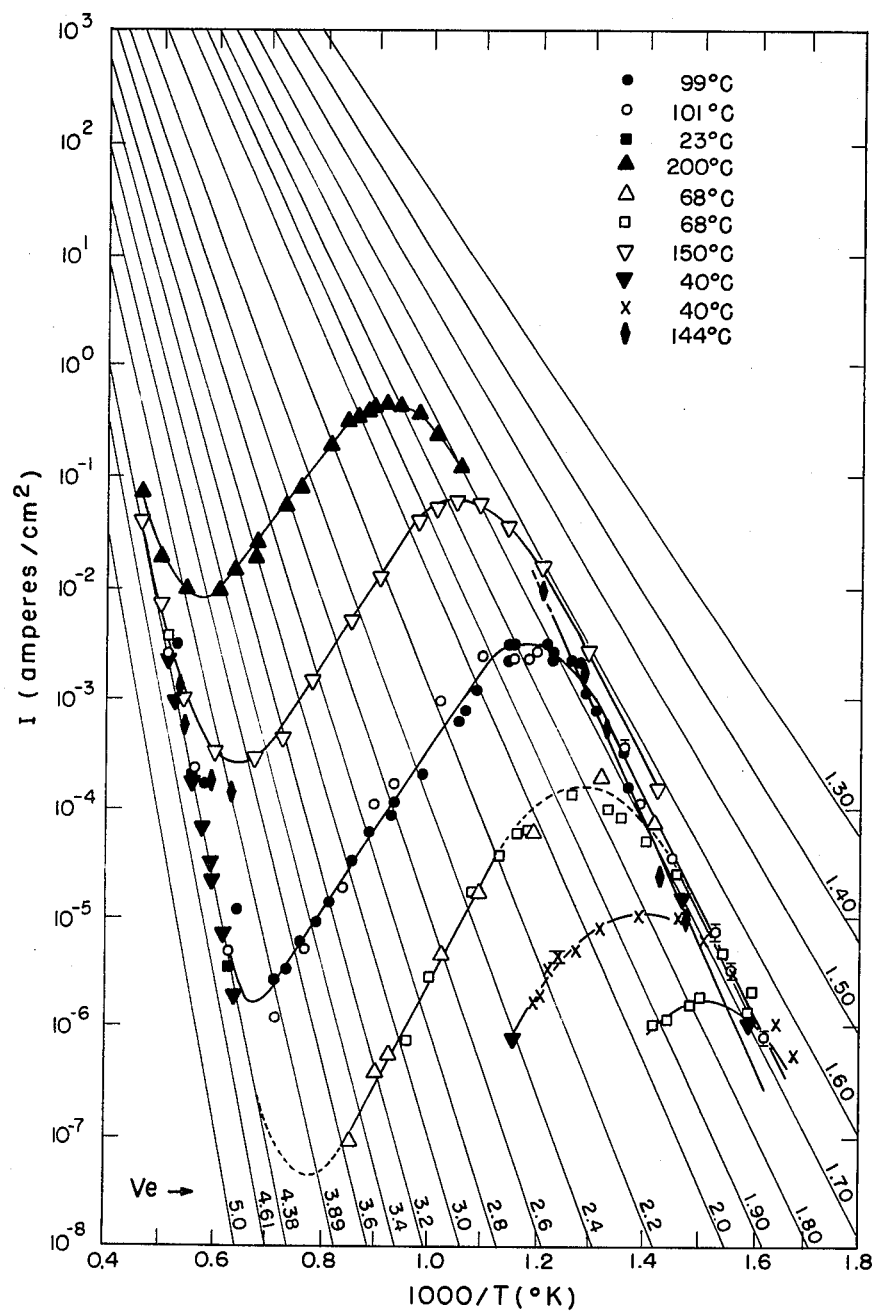
Figure 4:
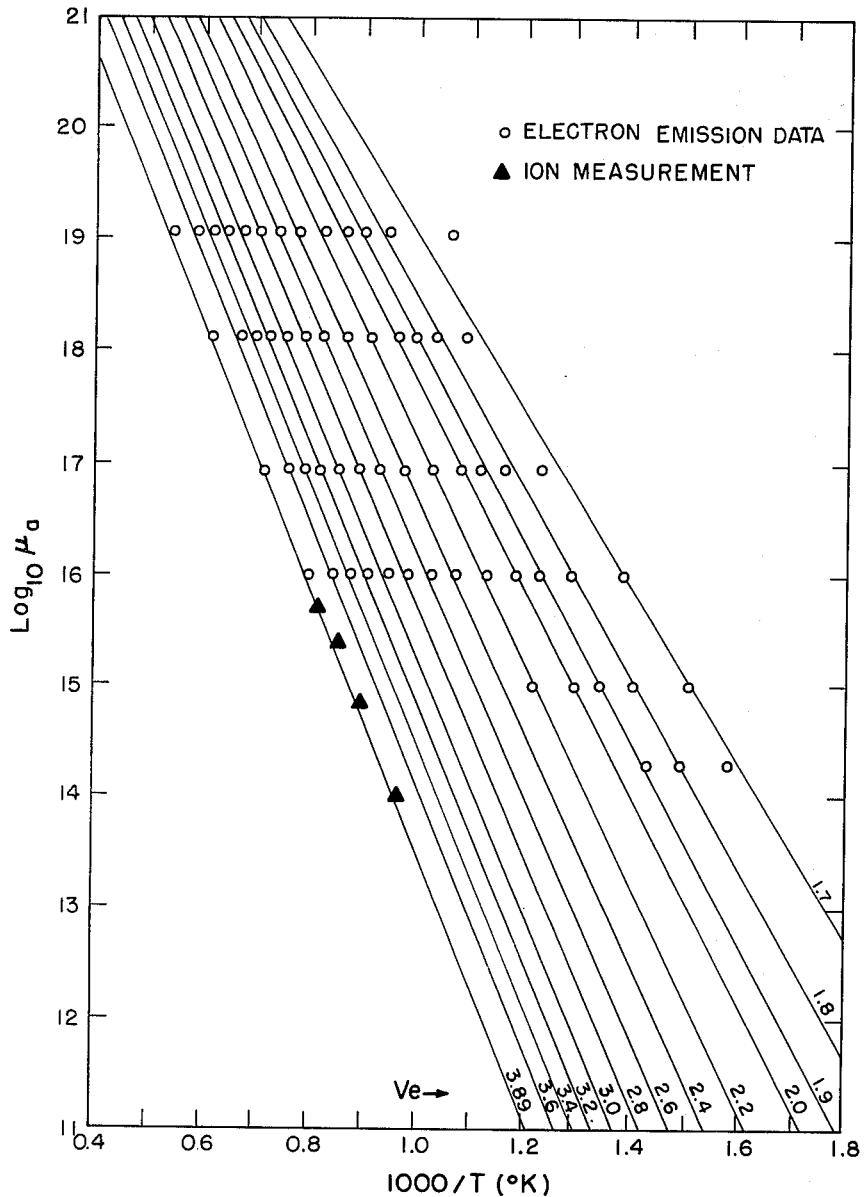
Figure 5:
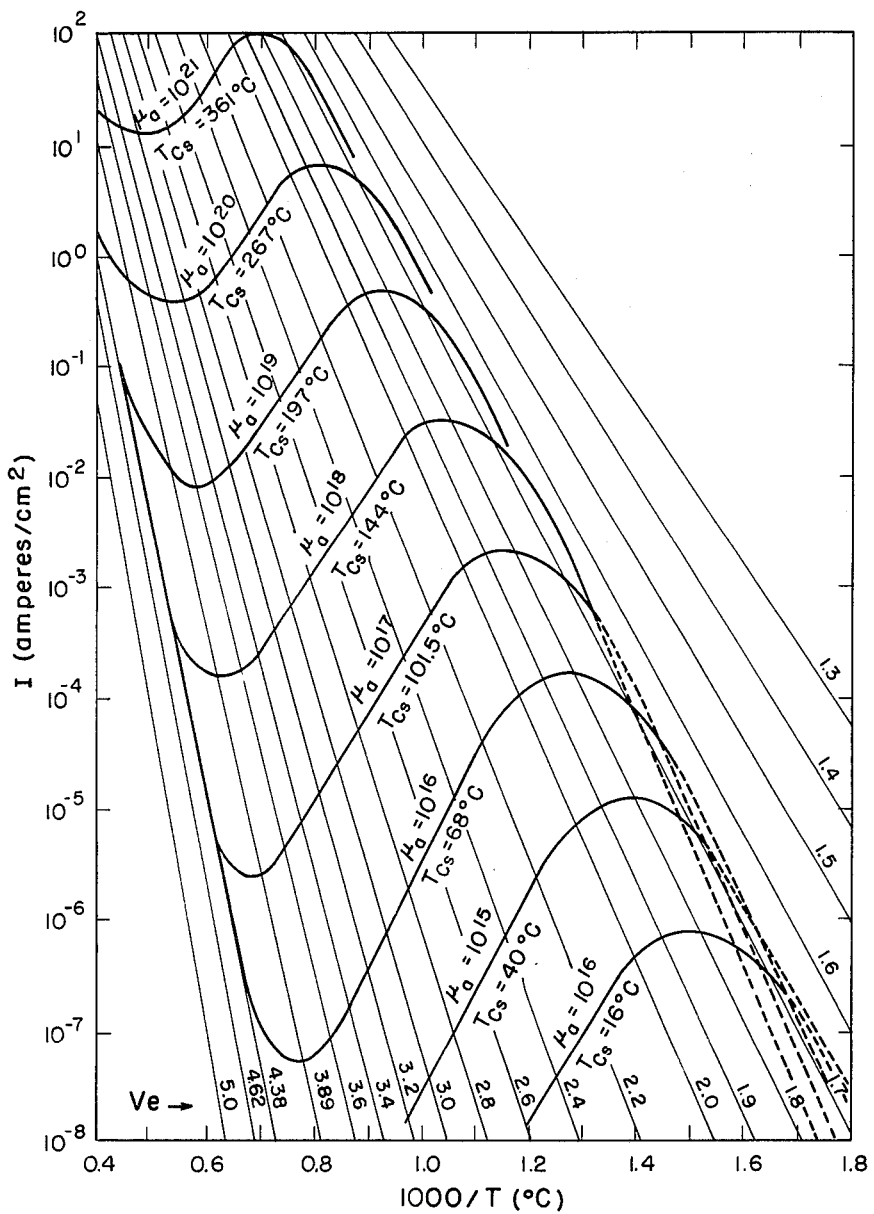
Figure 6:
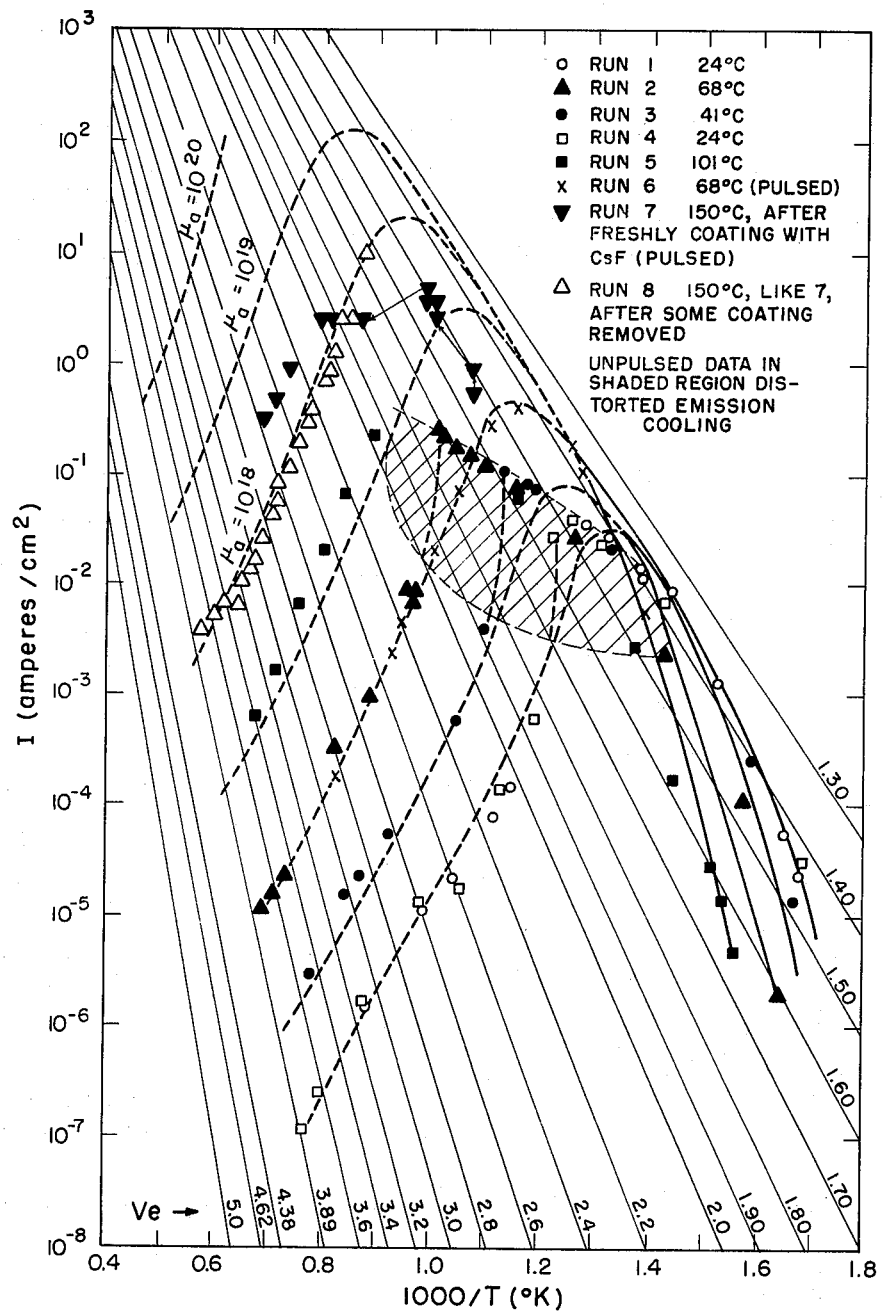
Figure 7:
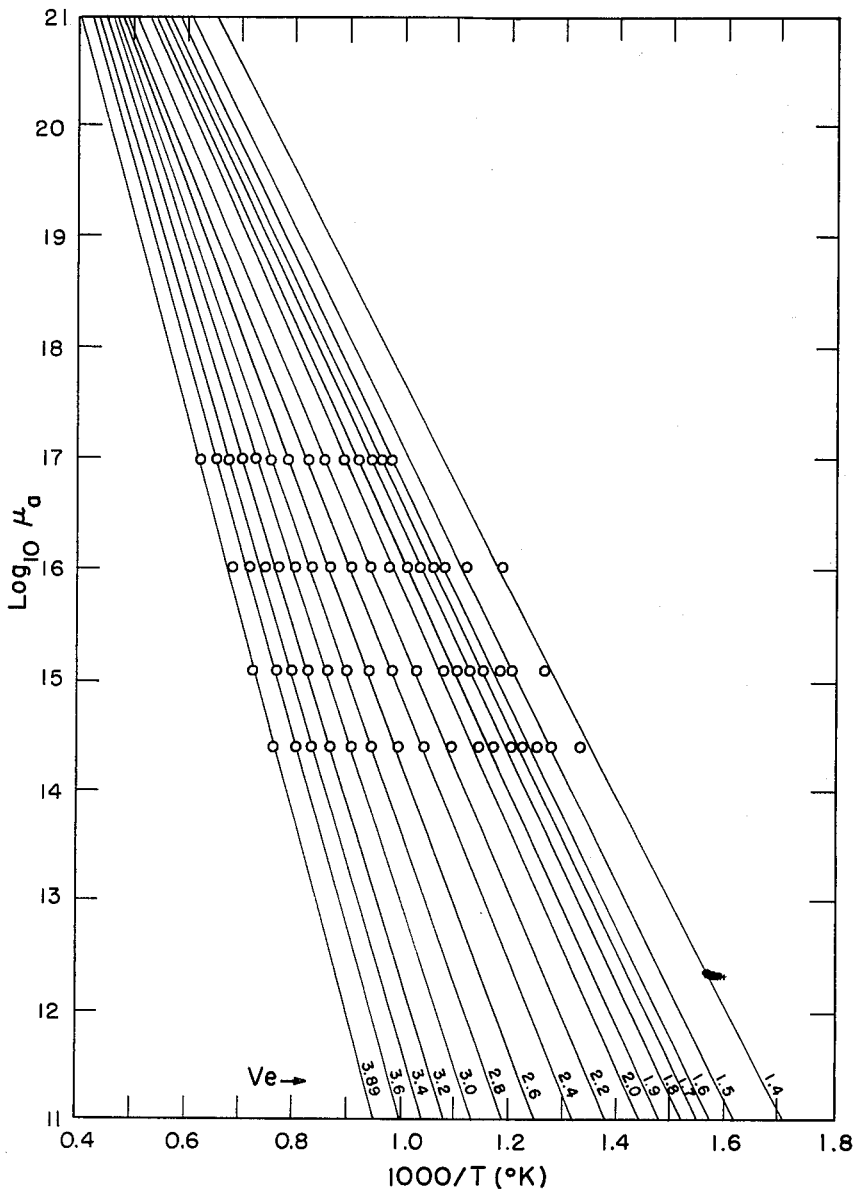
Figure 8:
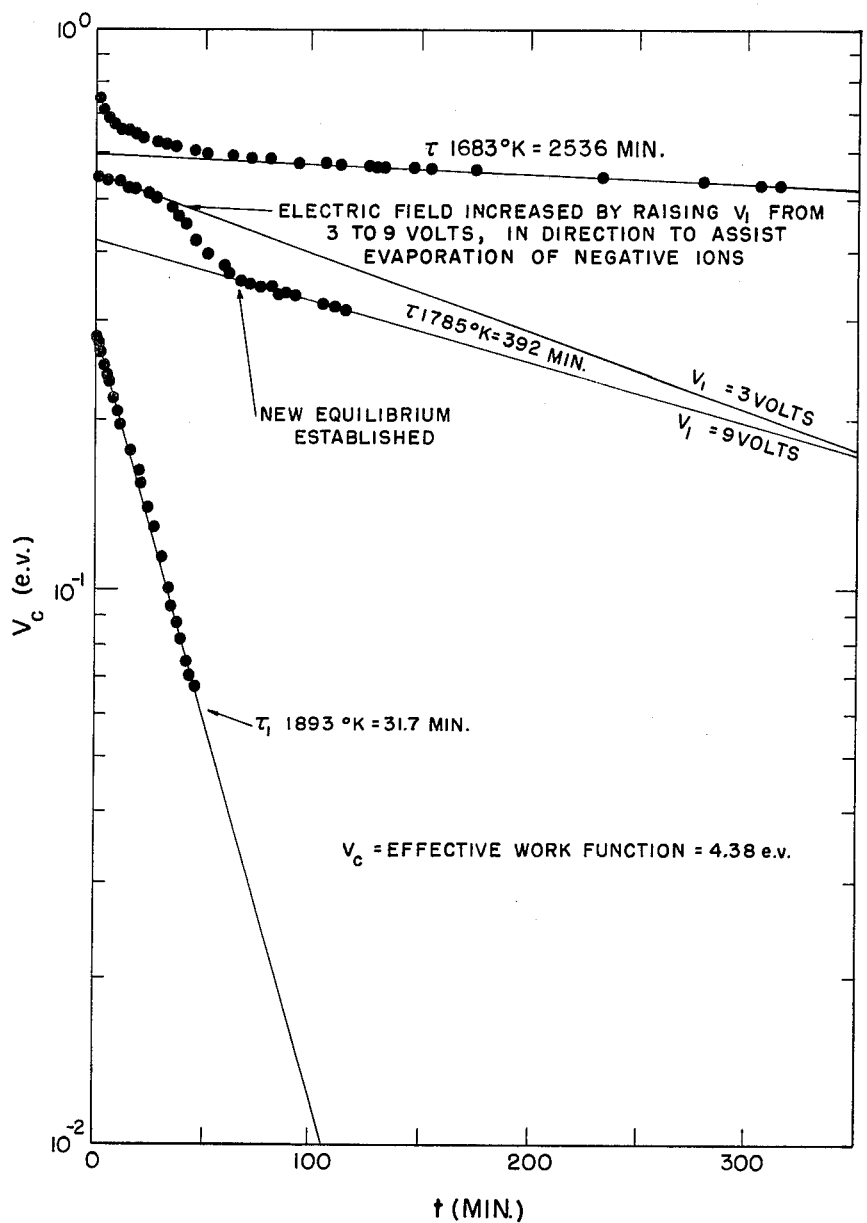

Other objects and advantages of the present invention will be apparent from the following detailed description taken in conjunction with the accompanying drawings in which:

FIGURE 1 is a vertical cross-sectional view of an experimental tube which illustrates the improvements made by the present inventors, FIGURE 2 is a schematic of the electrical circuit used in making measurements on the experimental tube of FIG. 1, FIGURE 3 is a graph showing the electron emission from molybdenum in cesium atmosphere (experimental), FIGURE 4 is a graph showing the equilibrium evaporation (arrival) rate of cesium on molybdenum at constant work function vs. 1000/T (° K.), FIGURE 5 is a graph showing the electron emission from molybdenum in cesium atmosphere (from data of FIG. 4), FIGURE 6 is a graph showing the electron emission from fluorine-coated molybdenum in cesium atmosphere (measurements and extrapolation via curves of FIG. 5), FIGURE 7 is a graph showing the equilibrium evaporation (arrival) rate of cesium on fluorine-coated molybdenum at constant work function vs. 1000/T (° K.), and FIGURE 8 is a graph showing the fluorine evaporation measurement, excess work function vs. time.

With reference to FIGURE 1 the experimental tube consists of a Pyrex envelope 1 of generally cylindrical shape. The envelope 1 is about 3 cm. in diameter and 10 cm. long. The reservoir 2 is attached to envelope 1 near one end thereof and is in fluid communiction with the interior of envelope 1. A molybdenum filament 3 extends longitudinally through the center of envelope 1 and is sealed to the respective ends of the envelope. The filament 3 has a 0.006-inch diameter and is essentially 30 cm. long. The filament 3 is coiled at sections 4 and 5. Each of these coiled sections if extended would be 10 cm. long, whereby the filament is essentially 30 cm. in length. At one end of filament 3 and within envelope 1 the filament 3 consists of a flat spring 6. The function of the spring 6 is to keep the filament under tension.

Two insulator glass folds 7 and 8 are connected to the envelope 1 near the center thereof to provide discontinuities 9 and 10 in the cylindrical portion fo envelope 1.

A portion of the inside of the envelope 1 is coated with a film of platinum to form three electrically conductive ring-shaped segments 11, 12 and 13. Each of these segments is electrically separated by the discontinuities 9 and 10.

Two electrical leads are connected to each of the segments 11, 12 and 13. Leads 14 and 15 extend through feed-throughs 16 and 17, respectively, and are electrically connected to segment 11. Leads 18 and 19 extend through feed-throughs 20 and 21, respectively, and are electrically connected to segment 12. Leads 22 and 23 extend through feed-throughs 24 and 25 and are electrically connected to segment 13.

The experimental tube shown in FIGURE 1 is similar to that used by Langmuir for tungsten measurements. Precautions were taken to avoid contamination by degreasing in a sonic bath, immersion in ultra-high purity (18 megohm) boiling water until ionic contamination was not observable and baking at 450° C. for several hours until the pressure had dropped to a few times $10^{-6}$ torr just outside the oven. After pinching off all unbaked portions, the remainder of the system was baked at 250° C. until the pressure was in the $10^{-7}$ range. When the system was cooled to room temperature, the pressure dropped to a few times $10^{-10}$ torr and the Vacion pump was extinguished.

Twice-distilled cesium was introduced through a side arm (the cesium-containing tube was placed just outside the oven to prevent reaction with the glass). Pumping continued through a liquid nitrogen trap until the pressure had fallen below $10^{-9}$ torr, while the cesium was distilled into a reservoir on the side of the tube. The glass seal-off was heated slowly to eliminate most of the occluded gas before the walls collapsed. A pressure rise of a few times $10^{-9}$ torr accompanied the completion of the seal. The filament 3 was heated several times during the first baking cycle, when the pressure had fallen below $10^{-5}$ torr. During the second baking cycle, it was held at 2200° K. for about one hour.

The filament temperature was measured with an optical micropyrometer. A temperature calibration curve was made after each of several periods of operation at 2200° K., until the current-temperature curve stabilized. Extrapolation to filament temperatures below 1000° K. was made by calculation of radiated power, using the known values of emissivity and resistivity. Correction for back radiation from the constant temperature bath became important at low temperatures.

FIGURE 2 shows the electrical circuit used in making measurements on the experimental tube. Transformer 30 and rectifier 31 supply rectified alternating current to heat filament 3. The filament current is determined by measuring the voltage drop across resistor R1 with potentiometer A. Filament voltage is measured by measuring the voltage on voltage divider R2 with potentiometer B. The temperature of the filament is determined by linearly interpolating between values of power, given by the product of the readings on potentiometers A and B, at calibration temperatures measured directly by an optical pyrometer. The envelope 1 is immersed in a constant temperature bath, indicated by the dotted line 32 around envelope 1.

D.C. voltage source B1 is used to apply a potential V1, measured by voltmeter 36, between the filament and the platinum collector rings. This potential is used to overcome the space charge within the tube. When using the present invention in a thermionic converter the space charge will be neutralized by cesium ions. As the work function of the filament may be too low to ionize cesium atoms, ions can be made by other means than surface ionization, i.e., separate ionizing grids, "patchy" cathode, low voltage arcs, oscillatory arcs, etc.

Leads 14 and 15 connected to segment 11 and leads 22 and 23 connected to segment 13 are connected together and grounded as shown at 33 in FIGURE 2, Electrical leads 18 and 19 connected to segment 12 are connected to the oscilloscope 34. The balancing voltage V2, supplied from battery B2, is connected in the circuit between resistor R3 and ground. The oscilloscope 34 is used as a null device, the balancing voltage V2 being adjusted while alternately pressing and releasing switch S1 which grounds the oscilloscope input. Voltmeter 35 is placed between resistor R3 and ground. The voltage across resistor R3 is recorded when the proper balancing voltage to obtain a null reading on the oscilloscope is obtained. The current is calculated from this voltage and the value of resistance R3. This current is equal to the amount of current collected by segment 12 from that part of filament 3 inside the segment.

Measurements were made during the "off" time of the half-wave, 60 cycle, heating current to avoid effects caused by the filament potential drop. This method of measurement allows the collector voltage to be within a few millivolts of the guard-ring voltage at the time of measurement.

When the emitted current became comparable to the heating current, the resultant cooling of the filament made it impossible to use the current-temperature calibration curve. The distortion of the "S curves" caused by this cooling is indicated by the shaded area in FIGURE 6. This effect was eliminated by pulsing V1. The pulses were about 100 $\mu$sec. long and synchronized with the 60 cycle heating current so that the duty cycle was $6 \times 10^{-3}$ With this arrangement, current densities as large as 10 amperes/cm.$^2$ were measured. Voltage drop along the filament decreased the effectiveness of the guard-rings at such high currents.

The first series of measurements was made with cesium in the tube. For the second series, a small crystal of cesium fluoride was placed inside the tube before the baking operation began. Absorbed water was expelled during the baking cycle before the cesium was added.

The results of the first series of measurements are given in FIGURES 3, 4 and 5. FIGURE 3 displays the experimental data, "electron emission vs. 1000/T" at various cesium bath temperatures. Lines of electron emission vs. temperature at constant effective work function, Ve, see E. Hensley, J. Appl. Phys. 32, 301 (1961), are superimposed on the figure. In FIGURE 4 the points of intersection of these lines with the experimental "S curves" are plotted, with log $\mu a$ as ordinate and 1000/T as abscissa. In accordance with Langmuir's "surface phase" postulate, see Phys. Rev. 44, 423 (1933), the points at constant work function lie approximately on a straight line. A series of such straight lines is drawn to fit the experimental data, subject to requirements of uniformity and continuity in slope and spacing. From these lines it is easy to reverse the process by which points were transferred from FIGURE 3 to FIGURE 4, for any desired values of $\mu_a$. A set of "S curves" for values of $\mu_a$ differing by a factor of 10 is shown in FIGURE 5.

The 3.89 ev. line in FIGURE 4 was extended into the region where the electron current was too small to measure, by means of ion current measurements. Schottky, see Handbuch der Exp. Phys., Bd XIII Teil 2, p. 88 (1928 Edition) derives the "Langmuir-Saha" equation, see Phys. Rev. 44, 423 (1933), giving the ratio of positive ion emission, $\gamma_p$, to atom emission, $\gamma_a$, in the form $$\gamma_p/\gamma_a = 60.2T^2 J_e^{-1} e^{-V_i/kT} \qquad (1)$$

where $J_e$ is the electron current density. If the Richardson-Dushman equation is used for $J_e$, this becomes $$\gamma_p/\gamma_a = \tfrac{1}{2} e^{-(V_i - V_e)/kT} \qquad (2)$$

where $V_e$ is the effective work function and $V_i$ the ionization potential of the evaporating species, 3.89 ev. for cesium. Measurements were made of ion current as the filament temperature was varied. The temperature at which the ion current was ⅓ of the peak ion current ($V_e = 3.89$ ev.), is plotted on FIGURE 4 vs. ⅔ of the measured value $\mu_a$. This reduction of $\mu_a$ was necessary to place the ion measurements on the same basis as the electron measurements, in which ion evaporation is prevented by a retarding field. In thermodynamic equilibrium the evaporating ions would be replaced by an equal current of incident ions while $\mu_a$ would have the value given in FIGURE 4.

The results of the second series of measurements are given in FIGURES 6 and 7. When cesium fluoride is present, there exists a family of "S curves" for each fractional-monolayer coverage of fluorine on molybdenum. The absolute value of this fractional coverage, $\theta_F$, was not determined in these experiments, but a series of "S curves" was run at low bath temperatures after first covering the filament with fluorine by raising the entire tube to 300° C. During these measurements the filament temperature was not raised above 1500° K. It was observed that some of the fluorine coating could be removed by raising the collection voltage above the cesium ionization potential and back-bombarding the filament with cesium ions. Some fluorine was lost in this manner during preliminary adjustments, so the "S curves" shown in FIGURE 6 do not correspond to the maximum degree of coverage of fluorine, as is shown by Runs 5 and 7. Between Runs 7 and 8 an abnormally large current was drawn at a filament temperature of 1675° K., reducing the fluorine coverage to give the curves of Run 8, slightly below the extrapolated "S curves." The first points of Run 7 were taken at low filament temperatures. The measured current was low until the filament had been heated to ~1200° K. The fresh cesium fluoride coat for this run was applied with the filament cool, and some activation process is indicated.

At cesium condensation temperatures greater than 150° C., measurements could not be made because of the discharges coincident with the filament heating pulses. Thus we could not measure the emission current at high filament temperatures, i.e., 2000° K., where high bath temperatures are required to replace the evaporating fluorine. The extrapolation of the electron emission measurements of FIGURE 6 into the higher filament temperature region is based on the assumption that the fluorine coating can be maintained.

A rough measurement of the mean life $\tau$ of adsorbed fluorine atoms was made by observing the decrease of effective work function with time at various filament temperatures. Before cesium was added to the tube the envelope was heated to ~300° K., the filament flashed, and the oven allowed to cool to room temperature. The filament was then heated to a temperature at which the electron current could be measured and the effective work function was plotted vs. time. When the rate of decrease of work function became small, the filament temperature was increased. FIGURE 8 shows the measured work function minus the work function of bare molybdenum, plotted vs. time at the various filament temperatures. The data suggest that a CsF arrival rate of $10^{12}$ (bath temperature ~260° C.) would be sufficient to maintain the fluorine coating at temperatures up to ~2000° F.

At a cathode temperature of 1900° K., the emission current density is 10 amperes/cm.$^2$ when the arrival rate of cesium is $\mu_a = 1.5 \times 12^{20}$. The corresponding 2.87 ev. work function is high enough to produce sufficient ions to neutralize the electron current. The cesium arrival rate is a factor of four lower than that required to maintain a bare molybdenum cathode at the same effective work function, so the cathode-anode spacing may be increased by the same factor. At lower cathode temperatures the emission current density remains high at cesium arrival rates as low as $10^{19}$ atoms/cm.$^2$ sec., but ion creating mechanisms other than surface ionization must be present for efficient operation.

The minimum work function of 1.38±.05 ev. may be advantageous for a thermionic converter anode. If such an anode is made of molybdenum it is unlikely that evaporating cathode material would change the work function, at least if the anode temperature were sufficiently high to "activate" the new surface layer. At the minimum work function the cesium-cesium fluoride-molybdenum cathode is among the most efficient known, with an emission of 700 ma./watt vs. 200–1000 for oxide-coated filaments, see Radio Engineers Handbook, Terman, (McGraw-Hill Book Co., Inc., New York, 1943), p. 284.

While the preferred embodiment of the present invention has been shown and described, it is to be understood that such embodiment is exemplary only and that changes and modifications can be made without departing from the spirit of the invention. For example, any of the alkali metals may be substituted for the cesium, and the fluorine may be introduced into the tube in any suitable manner, for example, as a gas.

What is claimed is:

1. In an electron discharge tube comprising an evacuated, sealed envelope, a cathode, means for heating said cathode, an anode, and means for connecting said cathode and said anode to an external electrical load, the improvement comprising a crystal of cesium fluoride positioned within said envelope and means for heating said crystal to a sufficient temperature to vaporize said cesium fluoride whereby fractional monolayers of cesium and fluoride will be adsorbed on said cathode.

2. An electron discharge tube as set forth in claim 1 wherein said cathode is fabricated from molybdenum, said temperature is 260° C., and said cathode has a temperature of 2000° K.

3. The method of improving the electron emission from a cathode in a cesium filled electron discharge tube comprising positioning a crystal of cesium fluoride within said tube and heating said crystal to a sufficient temperature to vaporize said cesium fluoride.

References Cited by the Examiner

UNITED STATES PATENTS

| | | | |
|---|---|---|---|
| 2,185,679 | 1/1940 | Parisot | 313—311 |
| 2,463,727 | 3/1949 | Veenemans | 313—311 |
| 2,605,438 | 7/1952 | Stutsman | 313—346 |
| 2,975,320 | 3/1961 | Knauer | 313—346 |
| 3,018,404 | 1/1962 | Dudley | 313—346 |

JOHN W. HUCKERT, *Primary Examiner.*

JAMES D. KALLAM, *Examiner.*